United States Patent Office 3,537,053
Patented Oct. 27, 1970

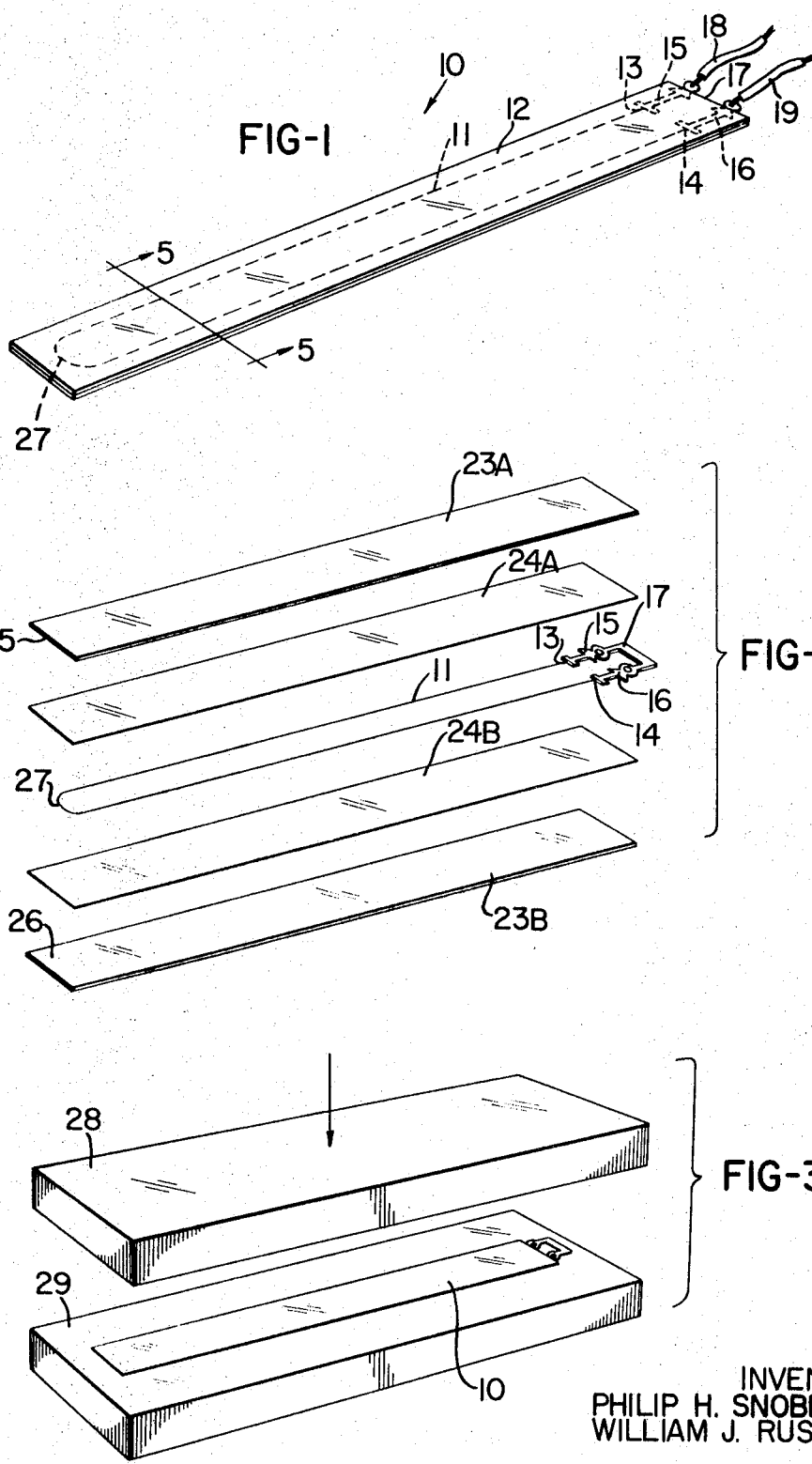

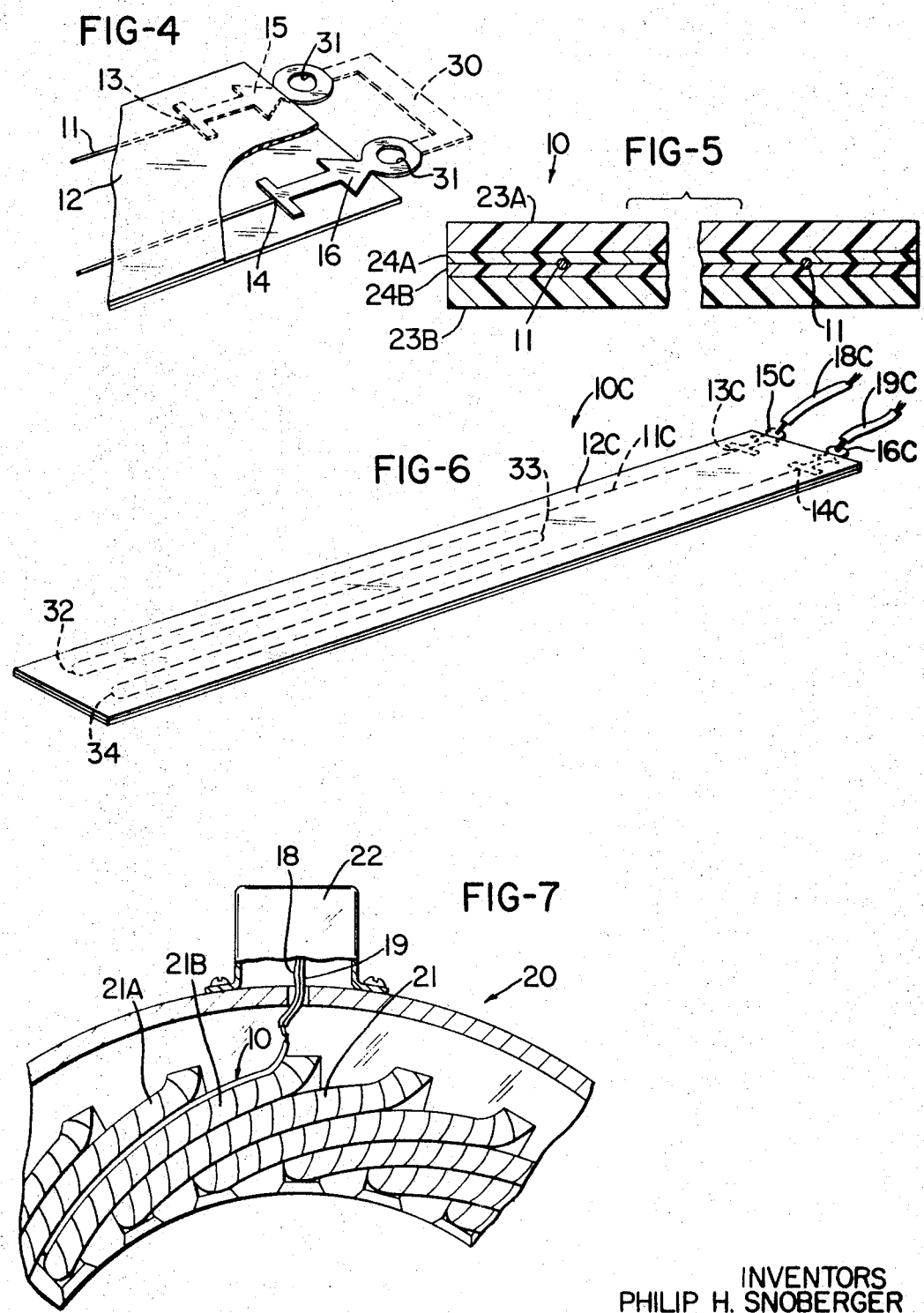

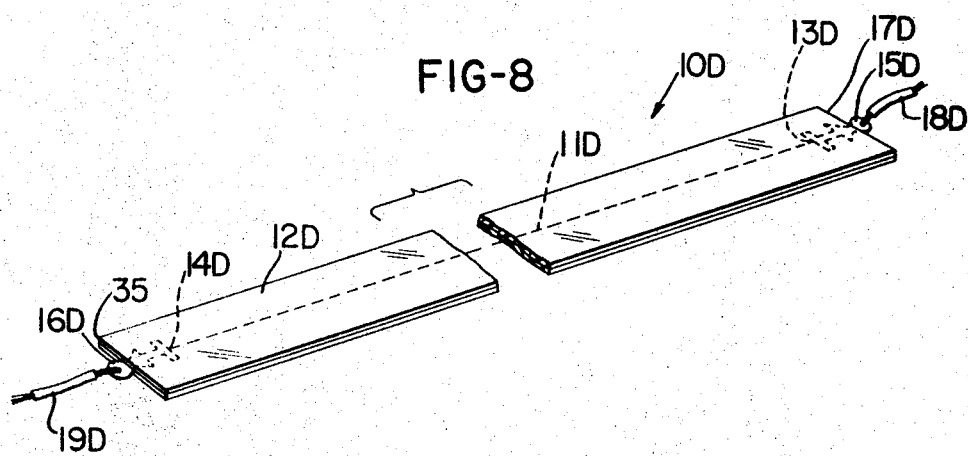
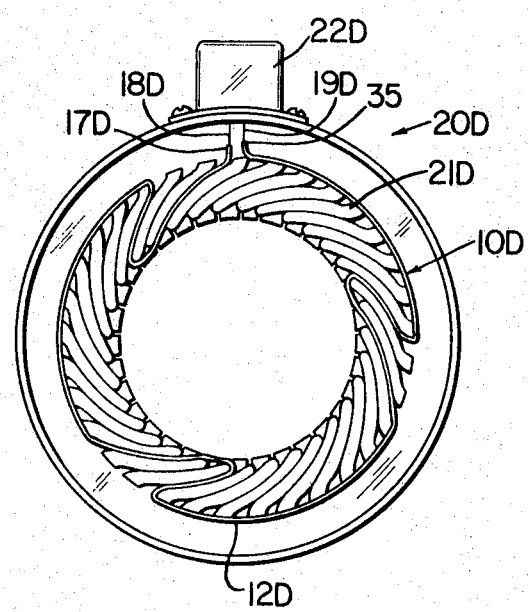

3,537,053
FLEXIBLE TEMPERATURE SENSOR FOR MOTOR PROTECTION
Philip H. Snoberger, Orange, Conn., and William J. Russell, Malvern, Pa., assignors to Robertshaw Controls Company, Richmond, Va., a corporation of Delaware
Original application Jan. 19, 1966, Ser. No. 521,591, now Patent No. 3,422,313, dated Jan. 14, 1969. Divided and this application June 17, 1968, Ser. No. 755,477
Int. Cl. H01c 3/00, 15/00
U.S. Cl. 338—25
8 Claims

ABSTRACT OF THE DISCLOSURE

A temperature sensor for sensing an overheated condition of the electrical coil of an electrical motor means or the like to terminate the operation of a motor means, the temperature sensor including a length of flexible wire encased in a flexible member so as to be adapted to be disposed between the coil means of the electrical motor to be flexed and compressed thereby without elongation of the encasing member so that the resistance of the wire will remain unchanged to accurately have the resistance thereof changed by the change in the temperature of the coil means.

---

This application is a divisional patent application of its co-pending parent application, Ser. No. 521,591, filed Jan. 19, 1966, now Pat. No. 3,422,313, and is assigned to the same assignee to whom the parent application is assigned.

This invention relates to an improved temperature sensor.

It is well known that various safety means have been provided in the past wherein a temperature sensing means is disposed in an electrical motor to detect a rise in temperature thereof above a safe temperature level during a malfunction in the operatiion of the motor whereby the temperature sensing means will activate a device to cause the motor to be turned off before the rise in temperature will adversely affect the electrical motor.

However, such prior known temperature sensing means normally comprise a resistance wire coiled on a mandrel and being encased in insulating means so that the temperature sensing means can be disposed in the wire coils of the motor means to detect a rise in temperature thereof through the change in resistance of the wire coiled on the mandrel to actuate the safety device.

These prior known temperature sensing means have various disadvantages that will not permit the prior known temperature sensing means to be accurate for the intended safety purpose thereof.

For example, when the resistance wire is coiled on the aforementioned mandrel, it has been found that a voltage is induced in the resistance wire due to a rapid rate of change in the amperage in the electrical motor when the rotor thereof has been locked, such amperages being as high as 645 amps, whereby such prior known temperature sensor could not be utilized with a voltage sensitive circuit.

In addition, the prior known mandrel will introduce a temperature lag in the sensing of the device because the mandrel will act as a heat sink, a feature particularly undesirable because the temperature of a malfunctioning electrical motor will rise to an adverse temperature in about four seconds or less whereby the detector must operate almost simultaneously with the rise in temperature to prevent a "burn-out" of the malfunctioning motor.

Another disadvantage of the the prior known temperature sensor is that the resistance wire being utilized is subject to "working" which changes the resistance thereof, the "working" of the resistance wire is caused by the bending of the wire and/or by tension being applied to the resistance wire during the insertion of the prior known temperature sensor into the wire coils of the motor, as well as during the subsequent compressing and compacting of the wire coils of the motor after the temperature sensing sensor has been placed therein.

Because the prior known temperature sensors are coiled on a mandrel, the mass of the temperature sensing wire is substantial and a relatively small total surface area of the total wire is responsive to the changes in the temperature of the motor whereby a high degree of accuracy is not possible.

However, according to the teachings of this invention, a temperature sensor is provided which eliminates all of the disadvantages of the prior known temperature sensing means, is more accurate for the intended purpose, and which can be manufactured in a simple and economical manner at a substantial savings over the prior known temperature sensing means.

In particular, the temperature sensing means of this invention comprises a flexible resistance wire encased in and secured to a flexible tape-like member which is adapted to be flexed and compressed without elongation thereof so that the resistance of the wire embedded therein remains the same regardless of the flexed and compressed condition of the encasing flexible member.

Accordingly, it is an object of this invention to provide an improved temperature sensor having one or more of the novel features set forth above or hereinafter shown or described.

Other objects, uses and advantages of this invention are apparent from a reading of this description, which proceeds with reference to the accompanying drawings forming a part thereof and wherein:

FIG. 1 is a perspective view illustrating one embodiment of the improved temperature sensor of this invention.

FIG. 2 is an exploded perspective view illustrating the various parts of the temperature sensor of FIG. 1.

FIG. 3 is a perspective view illustrating one of the steps in the method for forming the temperature sensor of FIG. 1 from the parts illustrated in FIG. 2.

FIG. 4 is an enlarged, fragmentary, perspective view illustrating the terminal lead attaching means of the temperature sensor of FIG. 1.

FIG. 5 is an enlarged, cross-sectional view taken on line 5—5 of FIG. 1.

FIG. 6 is a view similar to FIG. 1 and illustrates another embodiment of the temperature sensor of this invention.

FIG. 7 is a fragmentary, cross-sectional view illustrating the motor protection means of this invention utilizing the temperature sensor of FIG. 1.

FIG. 8 is a view similar to FIG. 1 and illustrates another temperature sensor of this invention.

FIG. 9 is a view similar to FIG. 7 and illustrates the temperature sensor of FIG. 8 being utilized in a motor protection system of this invention.

While the various features of this invention are hereinafter described and illustrated as being particularly adaptable for providing electrical motor protection means, it is to be understood that the various features of this invention can be utilized singly or in any combination thereof to provide temperature sensing means for other devices as desired.

Therefore, this invention is not to be limited to only the embodiments illustrated in the drawings, because the drawings are merely utilized to illustrate one of the wide variety of uses of this invention.

Referring now to FIG. 1, one embodiment of the improved temperature sensor of this invention is generally indicated by the reference numeral 10 and comprises a resistance wire 11 encased in and being secured to a flexible tape-like member 12, the resistance wire 11 having the opposd ends 13 and 14 thereof respectively interconnected to terminals 15 and 16 projecting out of one end 17 of the tape-like member 12. In this manner, the terminals 15 and 16 are adapted to be interconnected to leads 18 and 19 externally of the tape-like member 12.

The temperature sensor 10 is formed in a unique manner hereinafter described and is adapted to be utilized in a manner illustrated in FIG. 7 to protect an electrical motor means 20.

In particular, the motor means 20 of FIG. 7 includes a plurality of conventional stator windings or wire coils 21 arranged in circular fashion to form the stator means of the motor means 20 about the rotor means (not shown) of the motor 20. A conventional safety device 22 is carried by the motor means 20 for sensing the change in resistance of the wire 11 of the temperature sensor 10 of this invention, so that when the change in the resistance of the wire 11 reaches a particular condition, the device 22 will turn off the motor means 20.

The temperature sensor 10 of this invention is adapted to be disposed between adjacent coils 21A and 21B of the motor means 20 in the manner illustrated in FIG. 7 and be interconnected to the device 22 by the aforementioned leads 18 and 19. The temperature sensor 10 is adapted to be disposed between the coils 21A and 21B during the assembly of the motor means 20 whereby after the sensor 10 has been disposed in the coils 21 of the motor means 20, the coils 21 are compressed or compacted together during the further assembly operation of the motor means 20 and thereby further subject the temperature sensor 10 of this invention to a flexing compressing thereof.

However, the temperature sensor 10 of this invention is so constructed and arranged in a manner hereinafter set forth that regardless of the flexed and compressed condition of the sensor 10, the tape-like means 12 will not be elongated so as to subject the resistance wire 11 thereof to the aforementioned "working" thereof, whereby the resistance of the wire 11 remains the same regardless of the flexed and compressed condition of the temperature sensor 10 of this invention. In this manner, the temperature sensor 10 will be most accurate in its detection of the temperature change in the motor means 20 during the operation thereof.

Accordingly, it can be seen that if a malfunction occurs in the motor means 20 during the operation thereof, the rise in temperature of the motor means 20 due to the malfunction will cause a change in the resistance of the wire 11 of the sensor 10 in such a manner that should the resistance of the wire 11 reach a predetermined level, the detector 22 will turn off the motor means 20 before the rising temprature of the motor means 20 will adversely affect the same whereby a "burn-out" of the motor means 20 will be prevented.

The method for making the temperature sensing means 10 of this invention will now be described and reference is made to FIGS. 2–5.

As illustrated in FIG. 2, the tape-like means 12 is formed of two strips 23A and 23B of a polyimide resulting from the polycondensation reaction between pyromellitic dianhydride and an aromatic diamine sold by the E. I. du Pont de Nemours and Company, Inc., of Wilmington, Del., under the trade name of "Kapton." The strips 23A and 23B can be formed of any suitable thickness and in the embodiment of the temperature sensor 10 of this invention the strips 23A and 23B are each approximately 1 to 5 mils in thickness and have the characteristic that the same can be flexed and compressed without elongation thereof for the purpose previously described.

Two strips 24A and 24B of heat sealing means are laminated to the facing sides 25 and 26 of the strips 23A and 23B in any suitable manner. For example, the heat sealing strips 24A and 24B in the embodiment of this invention illustrated in FIG. 2 can each comprise a copolymer of tetrafluoroethylene and hexafluoropropylene, sold under the trademark of FEP-Teflon by E. I. du Pont de Nemours and Company, Inc., of Wilmington, Del.

The resistance wire 11 of the embodiment illustrated in FIG. 2 can comprise a nickel iron wire of approximately 72% nickel, having a diameter of approximately 0.0011 of an inch, wherein its resistance is about 105.00 ohms per foot at 20 degrees C. and has a positive temperature coefficient of resistance of approximately 0.0045% per degree C., or 0.0025% per degree F. When such a resistance wire 11 is utilized to provide a circuit of 70 ohms, about 8¼ inches of the wire 11 are required.

The wire 11 is bent into the configuration illustrated in FIG. 2 wherein a coplanar loop 27 is provided intermediate the ends 13 and 14 of the wire 11. The terminals 15 and 16 are formed from a substantially U-shaped blank 17 illustrated in FIG. 2 and are secured to the ends 13 and 14 of the wire 11 in any suitable manner to provide electrical connection therebetween.

The interconnected strips 23A, 24A and 23B, 24B are disposed in superimposed relation with the wire 11 and terminal blank 17 therebetween in the manner illustrated in FIG. 3 and are heat sealed and compressed together by heat sealing die blocks 28 and 29 in any suitable manner. For example, the heat sealing operation can take place at approximately 725° F.

In this manner, not only does the heat sealing means 24A and 24B securely bond the strips 23A and 23B together in superimposed relation, but also the same bond the resistance wire 11 and inner parts of the terminals 14 and 15 between the sheets 23A and 23B, with the wire 11 and inner parts of the terminals 14 and 15 being completely embedded in the heat sealing means 24A and 24B, in the manner illustrated in FIG. 5.

While the heat sealing strips 24A and 24B can be of any suitable thickness, the embodiment illustrated in FIG. 5 is formed with the strips 24A and 24B being approximately ½ mil in thickness.

Therefore, it can be seen that the tape-like means 12 of this invention can be formed in a simple and effective manner to encase the wire 11 therebetween whereby the wire 11 will not be subjected to the aforementioned "working," regardless of the flexed and compressed condition of the resulting temperature sensor 10 during its assembly with the motor means 20 previously described, because the tape-like means 23A and 23B will not elongate.

Further, it can be seen that the resistance wire 11 of this invention is not compressed or subjected to tension during the making of the temperature sensor 10 whereby the resistance of the wire 11 remains unchanged and can be accurately measured and predetermined.

After the sensor 10 has been formed in the manner illustrated in FIG. 3, the U part 30 of the terminal blank 17, illustrated in dotted lines in FIG. 4, is severed from the terminals 15 and 16 to complete the temperature sensor 10 of this invention, whereby the leads 18 and 19 can be subsequently interconnected to the terminals 15 and 16 at the aperture means 31 passing therethrough.

Therefore, it can be seen that the resulting temperature sensor 10 of this invention will not be subjected to the aforementioned induced voltage due to a locked rotor of the motor means 20 because of the single coplanar loop 27 thereof, whereas in the prior known temperature sensors the resistance wire has many loops coiled upon a mandrel and is subjected to such induced voltages. In addition, no mandrel is utilized for the resistance wire 11 of this invention whereby there is no temperature lag in the sensing of the sensor 10, because no mandrel means is provided which will act as a heat sink as in the prior known temperature sensors.

In addition, the mass of the wire 11 of the temperature sensor 10 of this invention is substantially negligible and a large surface area of the wire 11 is subjected to temperature variations in the motor means 20 so that the response of the wire 11 to temperature changes in the motor means 20 is excellent, whereas in the prior known temperature sensors a substantially large surface area of the resistance wire thereof is in direct contact with the mandrel carrying the same and not exposed to the temperature of the motor.

Accordingly, it can be seen that the temperature sensor 10 of this invention has many improved results over the prior known temperature sensors, while eliminating all of the disadvantages thereof.

While the temperature sensor 10 of this invention has been previously described and illustrated as having a single loop 27 in the resistance wire 11 thereof, it is to be understood that the resistance wire 11 can be disposed in various configuration thereof without changing the advantages of this invention.

For example, reference is now made to FIG. 6 wherein another temperature sensor of this invention is generally indicated by the reference numeral 10C and parts thereof similar to the temperature sensor 10 previously described are indicated by like reference numerals followed by the reference letter C.

As illustrated in FIG. 6, the temperature sensor 10C is formed in substantially the same manner as the temperature sensor 10 previously described in that the resistance wire 11C is encased in and secured to the flexible tape-like means 12C formed in the manner previously described with the opposed ends 13C and 14C of the resistance wire 11C being interconnected to the terminal means 15C and 16C for the purpose previously described.

However, the resistance wire 11C of the sensor 10C is provided with a plurality of loops 32, 33 and 34 to define a substantially M shape thereof to permit the length of the wire 11C to be substantially longer than the wire 11 previously described, while the overall length of the sensor 10C is substantially the same as the sensor 10 previously described. However, it can be seen that the loops 32, 33 and 34 of the resistance wire 11C are all coplanar with each other and with the tape-like means 12C, so that there will be no compacting and "working" thereof for the reasons previously described.

In addition, it may be found desirable to provide a relatively long temperature sensor according to the teachings of this invention which can be completely passed through the motor means.

For example, reference is now made to FIGS. 8 and 9 wherein another temperature sensor of this invention is generally indicated by the reference numeral 10D and parts thereof similar to the temperature sensor 10 previously described are indicated by like reference numerals followed by the reference letter D.

As illustrated in FIG. 8, the resistance wire 11D comprises a continuous length without any loops therein and being interconnected to terminal means 15D and 16D at the opposed ends 13D and 14D thereof, with the terminal means 15D and 16D projecting from the opposed ends 17D and 35 of the encasing and securing flexible tape-like means 12D.

In this manner, the temperature sensing means 10D of this invention can be passed through the motor means 20D in the manner illustrated in FIG. 8 so that the temperature sensing means D completely extends around and through the stator coils 21D, with the ends 35 and 17D of the sensor 10D being disposed closely adjacent each other and being interconnected to the detector 22D by the leads 18D and 19D respectively interconnected to the terminals 15D and 16D in the manner previously described.

Accordingly, it can be seen that the temperature sensors of this invention can have various configurations for particular purposes thereof, with each temperature sensor of this invention having the aforementioned advantages while still eliminating the previously described disadvantages of the prior known temperature sensing means.

Accordingly, it can be seen that this invention provides an improved temperature sensor.

What is claimed is:

1. A temperature sensor comprising a length of flexible wire adapted to have the resistance thereof changed by the change in temperature thereof, and a flexible member encasing and being secured to said wire, said encasing member being adapted to be flexed and compressed without elongation thereof whereby the resistance of said wire remains unchanged regardless of the flexed and compressed condition of said encasing member, said wire having opposed sides respectively secured to said flexible member and being disposed in two flat planes throughout the length of said wire in said encasing member with the distance between said planes being substantially equal to the transverse cross-sectional thickness of said wire.

2. A temperature sensor as set forth in claim 1 wherein said wire has a coplanar loop therein.

3. A temperature sensor as set forth in claim 2 wherein said flexible member is normally in flat tape-like form and said wire and loop thereof are coplanar with said flexible member.

4. A temperature sensor as set forth in claim 1 and including two terminal means respectively secured to the opposed ends of said length of wire.

5. A temperature sensor as set forth in claim 1 wherein said flexible member comprises two tape-like strips superimposed on each other and holding said wire therebetween, said tape-like strips providing flat opposed surfaces for said sensor.

6. A temperature sensor as set forth in claim 5 wherein each strip comprises a polyimide resulting from the polycondensation reaction between pyromellitic dianhydride and an aromatic diamine.

7. A temperature sensor as set forth in claim 6 wherein heat sealing means heat seals said strips together in said superimposed relation with said wire being embedded in said heat sealing means.

8. A temperature sensor as set forth in claim 7 wherein said heat sealing means comprises two strips of a copolymer of tetrafluoroethylene and hexafluoropropylene laminated respectively to the inner sides of said first-named strips.

References Cited

UNITED STATES PATENTS 2,569,714  10/1951  Gregory _____ 338—26 X
2,717,945   9/1955  Dresios et al. _____ 338—26

RODNEY D. BENNETT, JR., Primary Examiner

M. F. HUBLER, Assistant Examiner

U.S. Cl. X.R.

338—26, 212